(12) United States Patent
Yan

(10) Patent No.: US 10,085,468 B2
(45) Date of Patent: Oct. 2, 2018

(54) STORAGE TANK VACUUM-PUMPING DEVICE AND METHOD FOR KEEPING LONG-TIME FOOD FRESH UTILIZING STORAGE TANK

(71) Applicant: Shizhao Yan, Renhuai (CN)

(72) Inventor: Shizhao Yan, Renhuai (CN)

(73) Assignee: YONG CHAO PLASTIC TECHNOLOGY CO., LTD., Dongguan (CN)

( * ) Notice: Subject to any disclaimer, the term of this patent is extended or adjusted under 35 U.S.C. 154(b) by 238 days.

(21) Appl. No.: 14/996,212

(22) Filed: Jan. 14, 2016

(65) Prior Publication Data

US 2016/0345614 A1 Dec. 1, 2016

(30) Foreign Application Priority Data

May 27, 2015 (CN) .......................... 2015 1 0277665

(51) Int. Cl.
*A23L 3/01* (2006.01)
*A23L 3/015* (2006.01)
(Continued)

(52) U.S. Cl.
CPC ............. *A23L 3/0155* (2013.01); *A23L 3/001* (2013.01); *A23L 3/3418* (2013.01);
(Continued)

(58) Field of Classification Search
CPC ....... A23L 3/0155; A23L 3/3418; F04B 35/01
(Continued)

(56) References Cited

U.S. PATENT DOCUMENTS 6,830,081 B1 * 12/2004 Chen .................. B65D 81/2038
141/65
6,968,870 B1 * 11/2005 Tsay ...................... B65B 31/047
141/65

(Continued)

*Primary Examiner* — Timothy L Maust
(74) *Attorney, Agent, or Firm* — Wayne & Ken, LLC; Tony Hom

(57) ABSTRACT

The present invention specifically relates to a storage tank vacuum-pumping device and a method for keeping long-time food fresh utilizing the storage tank. The storage tank vacuum-pumping device comprises a shell, a seal ring, an air pumping assembly, an electric switch key, an air exhaust valve button, a pressure valve, a pressure valve spring and a pressure valve linkage switch, wherein the seal ring is fixed at the bottom of the shell; an air inlet pipe of the air pumping assembly is in communication with the storage tank, and the air pumping assembly is electrically connected with the electric switch key; both the electric switch key and the air exhaust valve button extend out from the top of the shell; a first closed pipeline which is in communication with the storage tank is arranged in the shell, the pressure valve is installed in the first closed pipeline, and the pressure valve spring is fixed between the first closed pipeline and the pressure valve; and the pressure valve linkage switch is aligned with the pressure valve, and the pressure valve linkage switch is connected with the electric switch key in series. In the present invention, by the automatic control of the pressure valve and the pressure valve linkage switch, the storage tank can keep a vacuum state for a long time, and then effectively keep food fresh for a long time.

5 Claims, 3 Drawing Sheets

(51) Int. Cl.
*B65B 31/04* (2006.01)
*B65B 31/06* (2006.01)
*A23L 3/00* (2006.01)
*F04B 35/01* (2006.01)
*F04B 37/10* (2006.01)
*F04B 39/12* (2006.01)
*F04B 53/14* (2006.01)
*A23L 3/3418* (2006.01)
*B65B 57/00* (2006.01)
*B65B 7/28* (2006.01)

(52) U.S. Cl.
CPC .......... *B65B 31/042* (2013.01); *B65B 31/047* (2013.01); *B65B 31/06* (2013.01); *F04B 35/01* (2013.01); *F04B 37/10* (2013.01); *F04B 39/12* (2013.01); *F04B 53/14* (2013.01); *A23V 2002/00* (2013.01); *B65B 7/2842* (2013.01); *B65B 57/00* (2013.01)

(58) Field of Classification Search
USPC .......................................................... 141/65
See application file for complete search history.

(56) References Cited

U.S. PATENT DOCUMENTS

| | | | |
|---|---|---|---|
| 7,328,730 B2 * | 2/2008 | Vilalta .................. | B65B 31/047 141/325 |
| 7,721,771 B2 * | 5/2010 | Tsay ........................... | B01J 3/03 141/65 |
| 7,757,725 B2 * | 7/2010 | Wang ................. | B65D 81/2038 141/302 |

* cited by examiner

Step 1: installing a sealing bottom cover with a one-way air vent valve at the opening of the storage tank;

Step 2: fixing a middle sealing protective sleeve at the top of the sealing bottom cover, the bottom of the middle sealing protective sleeve being closely connected with the sealing bottom cover;

Step 3: installing a storage tank vacuum-pumping device at the top of the middle sealing protective sleeve, and inserting the inserting part of the shell of the storage tank vacuum-pumping device in the middle sealing protective sleeve;

Step 4: pressing the electric switch key of the storage tank vacuum-pumping device, and starting the air pumping assembly, to pump out the air in the storage tank;

Step 5: gradually reducing the air pressure in the storage tank until the pressure valve declines in the first closed pipeline, and switching off the pressure valve linkage switch with the movement of the pressure valve so that the storage tank vacuum-pumping device stops operating;

Step 6: removing the middle sealing protective sleeve and the storage tank vacuum-pumping device so that the storage tank can keep a vacuum state and the middle sealing protective sleeve and the storage tank vacuum-pumping device can continuously perform vacuum-pumping on other storage tanks.

Fig. 3

STORAGE TANK VACUUM-PUMPING DEVICE AND METHOD FOR KEEPING LONG-TIME FOOD FRESH UTILIZING STORAGE TANK

CROSS-REFERENCE TO RELATED APPLICATIONS

This application is a continuation of, and claims priority to, Chinese Patent Application No. 201510277665.1 with a filing date of May 27, 2015. The content of the aforementioned application, including any intervening amendments thereto, is incorporated herein by reference.

TECHNICAL FIELD

The present invention belongs to the field of articles of daily use, and specifically relates to a device and method for vacuum storage.

BACKGROUND

Storage tank, as the name implies, is a container for storing articles, which is mainly used for storing food or moisture-proof articles. An ordinary storage tank can achieve the fresh keeping effect so long as food storage fresh keeping is defined as good container sealing performance. In fact, although an ordinary fresh keeping box has sealing characteristics, oxygen still exists in the box, while oxygen is just one of the key factors about whether fresh keeping is achieved.

To improve the fresh keeping effect of the storage tank, a vacuum-pumping mode can be adopted, to prevent oxygen from coming into contact with food, thereby achieving the purpose of prolonging the fresh keeping period of food. However, in the prior art, after vacuum-pumping is performed on the storage tank utilizing a vacuum-pumping machine, as time goes on, especially when sealing is poor, it is easy for air to enter the storage tank so that the fresh keeping function of the storage tank is destroyed.

SUMMARY OF THE INVENTION

The purpose of the present invention is to provide a vacuum-pumping device enabling a storage tank to keep a vacuum state for a long time and a method for keeping long-time food fresh utilizing the storage tank.

To achieve the above-mentioned purpose, the present invention provides a storage tank vacuum-pumping device, comprising a shell, a seal ring, an air pumping assembly, an electric switch key, an air exhaust valve button, a pressure valve, a pressure valve spring and a pressure valve linkage switch, wherein an inserting part inserted in an opening of a storage tank is arranged at the bottom of the shell, and the seal ring is fixed to the inserting part; the air pumping assembly is fixed inside the shell, an air inlet pipe of the air pumping assembly is in communication with the storage tank, and the air pumping assembly is electrically connected with the electric switch key; both the electric switch key and the air exhaust valve button extend out from the top of the shell to facilitate operation; a first closed pipeline which is in communication with the storage tank is arranged in the shell, the pressure valve is installed in the first closed pipeline, one end of the pressure valve spring is abutted at the bottom of the first closed pipeline, and the other end thereof is abutted at the top of the pressure valve; and the pressure valve linkage switch is aligned with the pressure valve, and the pressure valve linkage switch is connected with the electric switch key in series.

The storage tank vacuum-pumping device further comprises a seal ring switch button and a seal ring frame, wherein the seal ring switch button is fixed at the center of the seal ring frame, and the seal ring frame is supported at the inner side of the seal ring.

The storage tank vacuum-pumping device further comprises a pulling buckle, wherein the top of the shell is provided with a pulling buckle fixing position, and the pulling buckle is installed in the pulling buckle fixing position utilizing two rotating shafts; and the pulling buckle is provided with a trigger piece and a trigger rod, when the pulling buckle is closely attached to the a pulling buckle fixing position, the seal ring switch button is pressed by the trigger piece, and the trigger rod is abutted against the electric switch key.

The air pumping assembly comprises a motor, a helical gear, a circular gear and an air pump, wherein the output end of the motor is fixedly connected with the helical gear, and the helical gear is engaged with the circular gear; and the air pump comprises a sleeve and a piston installed in the sleeve, one end of the piston being fixed at the edge of the circular gear.

A second closed pipeline which is in communication with the storage tank is arranged in the shell, and the air exhaust valve button is installed in the second closed pipeline; an air exhaust valve button spring is arranged in the second closed pipeline, one end of the air exhaust valve button spring is abutted at the bottom of the second closed pipeline, and the other end thereof is abutted at the top of the air exhaust valve button; and the second closed pipeline is provided with a first ventilation hole, the air exhaust valve button is provided with a second ventilation hole, and the second ventilation hole is aligned with the first ventilation hole after the air exhaust valve button is pressed.

The shell comprises an upper shell and a lower shell, wherein the upper shell is fixedly connected with the lower shell by a fastening bolt; and the lower shell is provided with a seal ring fixing position, and the seal ring is installed in the seal ring fixing position.

In addition, the present invention further provides a method for keeping long-time food fresh utilizing the storage tank, comprising the following several steps:

Step 1: installing a sealing bottom cover with a one-way air vent valve at the opening of the storage tank;

Step 2: fixing a middle sealing protective sleeve at the top of the sealing bottom cover, the bottom of the middle sealing protective sleeve being closely connected with the sealing bottom cover;

Step 3: installing the storage tank vacuum-pumping device at the top of the middle sealing protective sleeve, and inserting the inserting part of the shell of the storage tank vacuum-pumping device in the middle sealing protective sleeve;

Step 4: pressing the electric switch key of the storage tank vacuum-pumping device, and starting the air pumping assembly, to pump out the air in the storage tank;

Step 5: gradually reducing the air pressure in the storage tank until the pressure valve declines in the first closed pipeline, and switching off the pressure valve linkage switch with the movement of the pressure valve so that the storage tank vacuum-pumping device stops operating; and Step 6: removing the middle sealing protective sleeve and the storage tank vacuum-pumping device so that the storage tank can keep a vacuum state and the middle sealing protective sleeve and the storage tank vacuum-pumping device can continuously perform vacuum-pumping on other storage tanks.

Wherein after step 6, steps 2 to 6 are repeatedly performed at intervals on the storage tank on which vacuum-pumping is already performed.

Wherein when the storage tank is required to be opened, steps 2 and 3 are repeatedly performed on the storage tank on which vacuum-pumping is already performed, and then the air exhaust valve button of the storage tank vacuum-pumping device is pressed.

Wherein in step 1, a double-layer seal ring is arranged on the sealing bottom cover of the one-way air vent valve, and a gap between the opening of the storage tank and the sealing bottom cover is filled by the double-layer seal ring.

The present invention has the beneficial effect that by means of the storage tank vacuum-pumping device provided in the present invention, the air in the storage tank is completely pumped utilizing the air pumping assembly, so that an oxygen-free vacuum state is kept in the storage tank, and then food can be kept fresh. Moreover, the storage tank vacuum-pumping device is provided with a pressure valve and a pressure valve linkage switch, which can automatically control the ON/OFF of the air pumping assembly according to the air pressure in the storage tank. When the air pressure in the storage tank is gradually reduced until the pressure valve declines in the first closed pipeline, the pressure valve linkage switch is switched off with the movement of the pressure valve, so that the storage tank vacuum-pumping device stops operating; when air enters the storage tank, the air pressure in the storage tank will be increased, the pressure valve rises in the first closed pipeline until the pressure valve linkage switch is triggered, and then the air pumping assembly is switched on to continue operating; and by the automatic control of the pressure valve and the pressure valve linkage switch, the storage tank can keep a vacuum state for a long time, and then effectively keep food fresh for a long time.

DESCRIPTION OF THE DRAWINGS

FIG. 3 is a flow diagram of the method for keeping long-time food fresh utilizing the storage tank provided in the present invention.

Main component symbols are explained as follows:

| | |
|---|---|
| 11. Shell | 12. Seal ring |
| 13. Air pumping assembly | 14. Electric switch key |
| 15. Air exhaust valve button | 16. Pressure valve |
| 17. Pressure valve linkage switch | 18. Pulling buckle |
| 19. Seal ring switch button | 20. Seal ring frame |
| 111. Upper shell | 112. Lower shell |
| 131. Motor | 132. Helical gear |
| 133. Circular gear | 134. Air pump |
| 181. Trigger piece | 182. Trigger rod |

DETAILED DESCRIPTION

Figure 1:
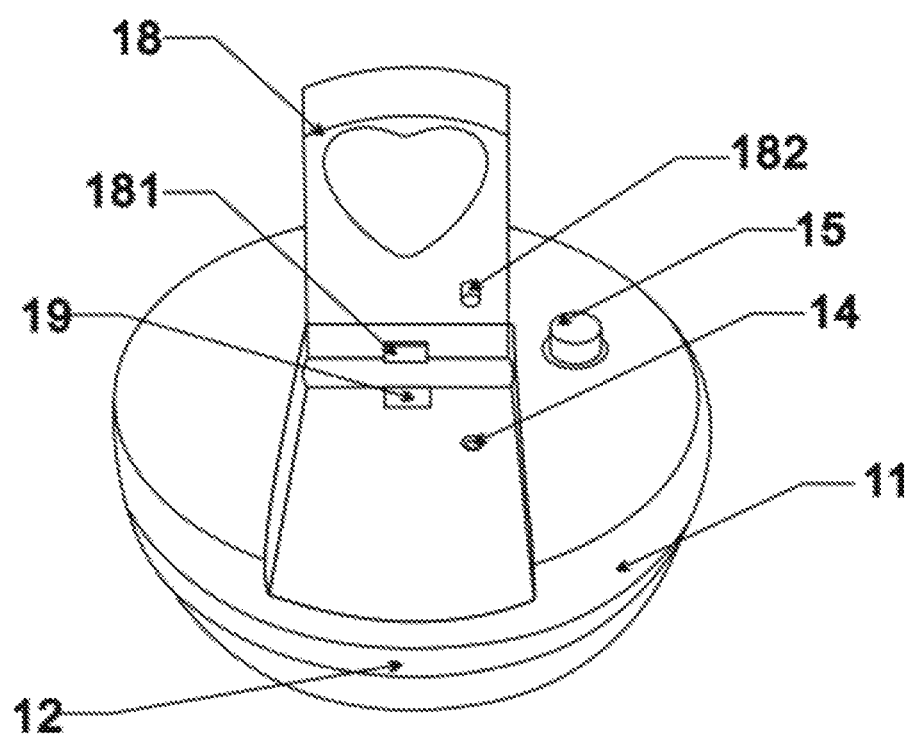
FIG. 1 is a structural diagram of the storage tank vacuum-pumping device provided in the present invention.
Figure 2:
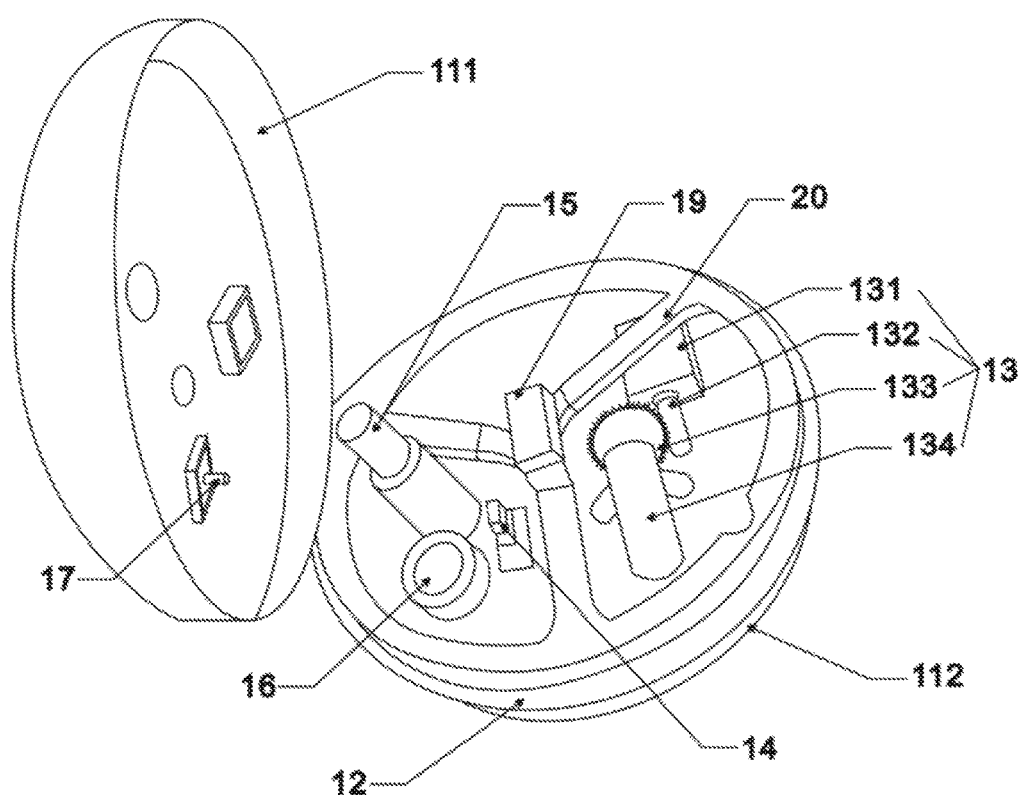
FIG. 2 is an internal structural diagram of the storage tank vacuum-pumping device provided in the present invention.

Referring to FIG. 1 and FIG. 2, the storage tank vacuum-pumping device provided in the present invention comprises a shell 11, a seal ring 12, an air pumping assembly 13, an electric switch key 14, an air exhaust valve button 15, a pressure valve 16, a pressure valve spring and a pressure valve linkage switch 17, wherein an inserting part inserted in an opening of a storage tank is arranged at the bottom of the shell 11, and the seal ring 12 is fixed to the inserting part; the air pumping assembly is fixed inside the shell, an air inlet pipe of the air pumping assembly is in communication with the storage tank, and the air pumping assembly is electrically connected with the electric switch key; both the electric switch key 14 and the air exhaust valve button 15 extend out from the top of the shell 11 to facilitate operation; a first closed pipeline which is in communication with the storage tank is arranged in the shell 11, the pressure valve 16 is installed in the first closed pipeline, one end of the pressure valve spring is abutted at the bottom of the first closed pipeline, and the other end thereof is abutted at the top of the pressure valve 16; and the pressure valve linkage switch 17 is aligned with the pressure valve 16, and the pressure valve linkage switch 17 is connected with the electric switch key 14 in series.

The storage tank vacuum-pumping device provided in the present invention has the following operating principles that: the inserting part of the shell 11 is inserted in the opening of the storage tank, to achieve a sealing connection between the storage tank vacuum-pumping device and the storage tank; the electric switch key 14 is pressed, and the air pumping assembly is started, to pump out the air in the storage tank through the air inlet pipe; the air pressure in the storage tank is gradually reduced until the pressure valve 16 declines in the first closed pipeline, and the pressure valve linkage switch 17 is switched off with the movement of the pressure valve 16, so that the storage tank vacuum-pumping device stops operating; after placement for a certain time, if air penetratively enters the storage tank, the air pressure in the storage tank will be increased, when the air pressure is increased to a certain degree, the pressure valve 16 rises in the first closed pipeline until the pressure valve linkage switch 17 is triggered, and then the air pumping assembly 13 is switched on to continue operating until the pressure valve linkage switch 17 is switched off once again, so that storage tank vacuum-pumping device stops operating; and these steps are repeatedly performed to ensure that a vacuum state is always kept in the storage tank.

Compared with the prior art, the storage tank vacuum-pumping device provided in the present invention has the advantages that the air in the storage tank is completely pumped utilizing the air pumping assembly 13, so that an oxygen-free vacuum state is kept in the storage tank, and then food can be kept fresh. Moreover, the storage tank vacuum-pumping device is provided with a pressure valve 16 and a pressure valve linkage switch 17, which can automatically control the ON/OFF of the air pumping assembly 13 according to the air pressure in the storage tank. When the air pressure in the storage tank is gradually reduced until the pressure valve 16 declines in the first closed pipeline, the pressure valve linkage switch 17 is switched off with the movement of the pressure valve, so that the storage tank vacuum-pumping device stops operating; when air penetratively enters the storage tank, the air pressure in the storage tank will be increased, the pressure valve 16 rises in the first closed pipeline until the pressure valve linkage switch 17 is triggered, and then the air pumping assembly 13 is switched on to continue operating; and by the automatic control of the pressure valve 16 and the pressure valve linkage switch 17, the storage tank can keep a vacuum state for a long time, and then effectively keep the food fresh for a long time.

In the present embodiment, the storage tank vacuum-pumping device further comprises a seal ring switch button 19 and a seal ring frame 20, wherein the seal ring switch button 19 is fixed at the center of the seal ring frame 20, and the seal ring frame 20 is supported at the inner side of the seal ring 12.

Specifically, the storage tank vacuum-pumping device further comprises a pulling buckle 18, wherein the top of the shell 11 is provided with a pulling buckle fixing position, and the pulling buckle 18 is installed in the pulling buckle fixing position utilizing two rotating shafts; and the pulling buckle 18 is provided with a trigger piece 181 and a trigger rod 182, when the pulling buckle 18 is closely attached to the a pulling buckle fixing position, the seal ring switch button 19 is pressed by the trigger piece 181, and the trigger rod 182 is abutted against the electric switch key 14.

The pulling buckle 18 is skillfully designed, so that the electric switch key 14 and the seal ring switch button 19 can be controlled simultaneously. The pulling buckle 18 can rotate around the rotating shafts relative to the top of the shell 11. When the pulling buckle 18 is in a closed state, that is, the pulling buckle is closely attached to the top of the shell 11, the seal ring switch button 19 is downwards pressed by the trigger piece 181 of the pulling buckle 18, and the seal ring 12 is expanded to the periphery by the seal ring frame 20, so that the tightness of connection between the storage tank and the shell 11 can be further improved; and at the same time, the electric switch key 14 is downwards pressed by the trigger rod 182, to switch on a circuit of the air pumping assembly 13.

In the present embodiment, the air pumping assembly 13 comprises a motor 131, a helical gear 132, a circular gear 133 and an air pump 134, wherein the output end of the motor 131 is fixedly connected with the helical gear 132, and the helical gear 132 is engaged with the circular gear 133; and the air pump 134 comprises a sleeve and a piston installed in the sleeve, one end of the piston being fixed at the edge of the circular gear 133. The motor 131 drives the circular gear 133 to rotate through the helical gear 132, so as to drive the piston to do reciprocating circulating movement in the sleeve, thereby achieving the air pumping motion. Of course, this is only a specific embodiment of the present invention. The structure of the air pumping assembly 13 is not only limited to the above, and can be other devices capable of achieving vacuum-pumping motion as well.

In the present embodiment, a second closed pipeline which is in communication with the storage tank is arranged in the shell 11, and the air exhaust valve button 15 is installed in the second closed pipeline; an air exhaust valve button spring is arranged in the second closed pipeline, one end of the air exhaust valve button spring is abutted at the bottom of the second closed pipeline, and the other end thereof is abutted at the top of the air exhaust valve button 15; and the second closed pipeline is provided with a first ventilation hole, the air exhaust valve button 15 is provided with a second ventilation hole, and the second ventilation hole is aligned with the first ventilation hole after the air exhaust valve button 15 is pressed.

When the air exhaust valve button 15 is downwards pressed, the second ventilation hole is aligned with the first ventilation hole, the outside air enters the storage tank through the two ventilation holes, and the air pressure in the storage tank is recovered, so that the storage tank can be easily opened.

In the present embodiment, the shell 11 comprises an upper shell 111 and a lower shell 112, wherein the upper shell 111 is fixedly connected with the lower shell 112 by a fastening bolt, the upper shell 111 and the lower shell 112 form a containing cavity, and all working components thereof are installed in the containing cavity; and the lower shell 112 is provided with a seal ring 12 fixing position, and the seal ring 12 is installed in the seal ring 12 fixing position.

Referring to FIG. 3, the present invention further provides a method for keeping long-time food fresh utilizing the storage tank, comprising the following several steps:

Step 1: installing a sealing bottom cover with a one-way air vent valve at the opening of the storage tank;

Step 2: fixing a middle sealing protective sleeve at the top of the sealing bottom cover, the bottom of the middle sealing protective sleeve being closely connected with the sealing bottom cover;

Step 3: installing the storage tank vacuum-pumping device at the top of the middle sealing protective sleeve, and inserting the inserting part of the shell 11 of the storage tank vacuum-pumping device in the middle sealing protective sleeve;

Step 4: pressing the electric switch key 14 of the storage tank vacuum-pumping device, and starting the air pumping assembly 13, to pump out the air in the storage tank;

Step 5: gradually reducing the air pressure in the storage tank until the pressure valve 16 declines in the first closed pipeline, and switching off the pressure valve linkage switch 17 with the movement of the pressure valve 16, so that the storage tank vacuum-pumping device stops operating; and Step 6: removing the middle sealing protective sleeve and the storage tank vacuum-pumping device so that the storage tank can keep a vacuum state and the middle sealing protective sleeve and the storage tank vacuum-pumping device can continuously perform vacuum-pumping on other storage tanks.

Compared with the prior art, the method for keeping long-time food fresh utilizing the storage tank provided in the present invention has the advantages that each storage tank is provided with a sealing bottom cover, the sealing bottom cover, the middle sealing protective sleeve and the storage tank vacuum-pumping device form a separable structure, and after the storage tank vacuum-pumping device completes the vacuum-pumping motion, the middle sealing protective sleeve and the storage tank vacuum-pumping device can be separated from the storage tank to perform operation on other storage tanks. One middle sealing protective sleeve and one storage tank vacuum-pumping device are utilized to cooperate with a plurality of sealing bottom covers, so that a plurality of storage tanks are made to be in an operating state without providing a storage tank vacuum-pumping device for each storage tank, thereby saving a large number of resources and reducing usage costs.

After step 6, steps 2 to 6 are repeatedly performed at intervals on the storage tank on which vacuum-pumping is already performed. After the middle sealing protective sleeve is connected with the storage tank vacuum-pumping device, the vacuum environment of the storage tank is detected by the storage tank vacuum-pumping device. If it is detected that air enters the storage tank, the vacuum-pumping motion is performed once again under the control of the pressure valve 16 and the pressure valve linkage switch 17, to realize keeping the vacuum environment in the storage tank for a long time.

When the storage tank is required to be opened, steps 2 and 3 are repeatedly performed on the storage tank on which vacuum-pumping is already performed, and then the air exhaust valve button 15 of the storage tank vacuum-pumping device is pressed. After the middle sealing protective sleeve is reconnected with the storage tank vacuum-pumping device, the air pressure in the storage tank can be recovered, so that the storage tank is easily opened.

In step 1, a double-layer seal ring 12 is arranged on the sealing bottom cover of the one-way air vent valve, and a gap between the opening of the storage tank and the sealing bottom cover is filled by the double-layer seal ring 12. The double-layer seal ring 12 can ensure the tightness at the opening of the storage tank, thereby improving the air pumping efficiency and vacuum keeping time.

The above descriptions are only preferred embodiments of the present invention. It should be noted that, for those ordinary skilled in the art, many modifications and polishes may be made without departure from the technical principles of the present invention, and these modification and polishes should also be deemed to be fallen into the protection scope of the present invention.

I claim:

1. A storage tank vacuum-pumping device, comprising:
a shell,
a seal ring,
an air pumping assembly,
an electric switch key,
an air exhaust valve button, a pressure valve,
a pressure valve spring,
a pressure valve linkage switch,
a seal ring switch button,
a seal ring frame, and
a pulling buckle;
wherein an inserting part inserted in an opening of a storage tank is arranged at the bottom of the shell, and the seal ring is fixed to the inserting part; the air pumping assembly is fixed inside the shell; an air inlet pipe of the air pumping assembly is in communication with the storage tank, and the air pumping assembly is electrically connected with the electric switch key; both the electric switch key and the air exhaust valve button extend out from the top of the shell to facilitate operation; a first closed pipeline in communication with the storage tank is arranged in the shell; the pressure valve is installed in the first closed pipeline; one end of the pressure valve spring is abutted at the bottom of the first closed pipeline, and the other end thereof is abutted at the top of the pressure valve; and the pressure valve linkage switch is aligned with the pressure valve, and the pressure valve linkage switch is connected with the electric switch key in series; and
wherein the top of the shell is provided with a pulling buckle fixing position, and the pulling buckle is installed in the pulling buckle fixing position utilizing two rotating shafts; and the pulling buckle is provided with a trigger piece and a trigger rod, when the pulling buckle is closely attached to the pulling buckle fixing position, the seal ring switch button is pressed by the trigger piece, and the trigger rod is abutted against the electric switch key.

2. The storage tank vacuum-pumping device of claim 1, wherein the seal ring switch button is fixed at the center of the seal ring frame, and the seal ring frame is supported at the inner side of the seal ring.

3. The storage tank vacuum-pumping device of claim 1, wherein the air pumping assembly comprises a motor, a helical gear, a circular gear and an air pump; wherein the output end of the motor is fixedly connected with the helical gear, and the helical gear is engaged with the circular gear; and the air pump comprises a sleeve and a piston installed in the sleeve, one end of the piston being fixed at the edge of the circular gear.

4. The storage tank vacuum-pumping device of claim 1, wherein a second closed pipeline in communication with the storage tank is arranged in the shell, and the air exhaust valve button is installed in the second closed pipeline; an air exhaust valve button spring is arranged in the second closed pipeline, one end of the air exhaust valve button spring is abutted at the bottom of the second closed pipeline, and the other end thereof is abutted at the top of the air exhaust valve button; and the second closed pipeline is provided with a first ventilation hole, the air exhaust valve button is provided with a second ventilation hole, and the second ventilation hole is aligned with the first ventilation hole after the air exhaust valve button is pressed.

5. The storage tank vacuum-pumping device of claim 1, wherein the shell comprises an upper shell and a lower shell; the upper shell is fixedly connected with the lower shell by a fastening bolt; and the lower shell is provided with a seal ring fixing position; and the seal ring is installed in the seal ring fixing position.

* * * * *